US012800652B2

(12) United States Patent
Bhattacharya et al.

(10) Patent No.: US 12,800,652 B2
(45) Date of Patent: Nov. 17, 2026

(54) DETECTION OF MALICIOUS CIRCUITS INSERTED IN ANALOG CIRCUITS

(71) Applicant: Synopsys, Inc., Sunnyvale, CA (US)

(72) Inventors: Mayukh Bhattacharya, Palo Alto, CA (US); Jayeeta Chaudhuri, Tempe, AZ (US); Krishnendu Chakrabarty, Tempe, AZ (US)

(73) Assignee: Synopsys, Inc., Sunnyvale, CA (US)

( * ) Notice: Subject to any disclaimer, the term of this patent is extended or adjusted under 35 U.S.C. 154(b) by 450 days.

(21) Appl. No.: 18/440,761

(22) Filed: Feb. 13, 2024

(65) Prior Publication Data

US 2025/0258220 A1 Aug. 14, 2025

(51) Int. Cl.
*G01R 31/3163* (2006.01)
*G06F 21/76* (2013.01)

(52) U.S. Cl.
CPC ......... *G01R 31/3163* (2013.01); *G06F 21/76* (2013.01)

(58) Field of Classification Search
None
See application file for complete search history.

(56) References Cited

U.S. PATENT DOCUMENTS

2012/0278893 A1* 11/2012 Jyothi ................... G06F 21/566 726/24
2018/0262327 A1* 9/2018 Jain ................... H04L 12/40013

OTHER PUBLICATIONS

Worley et al., "Supervised Machine Learning Techniques for Trojan Detection with Ring Oscillator Network," 2019 SoutheastCon, Huntsville, AL, USA, 2019, pp. 1-7, doi: 10.1109/SoutheastCon42311.2019.9020626. (Year: 2019).*
Abedi, M. et al. "High-Precision Nano-Amp Current Sensor and Obfuscation based Analog Trojan Detection Circuit." *IEEE International Symposium on Circuits and Systems* (*ISCAS*), May 27, 2022, 5 pages.
Hou, Y. et al. "R2D2: Runtime reassurance and detection of A2 Trojan", *IEEE International Symposium on Hardware Oriented Security and Trust* (*HOST*), Apr. 30, 2018, 6 pages.
Shakya, B. et al. "Benchmarking of hardware trojans and maliciously affected circuits," *Journal of Hardware and Systems Security*, vol. 1, 18 pages.

(Continued)

*Primary Examiner* — Arleen M Vazquez
*Assistant Examiner* — Denise R Karavias
(74) *Attorney, Agent, or Firm* — Fenwick & West LLP

(57) ABSTRACT

A Trojan detection system places watermark circuits within an analog circuit design that allow the system to observe a node within an analog circuit under test (CUT) that is otherwise not observable. The watermark circuit can be a pass transistor logic (PTL)-based connection between the node and a readable output pin (i.e., a "watermark output pin"). In particular, the watermark circuits can be inserted at a node where a Trojan is likely to be inserted; thus, the watermarks provide a manner for observing changes (e.g., voltage changes) caused by a malicious modification to an analog circuit. The detection system can identify potential locations (nodes) in the CUT where a Trojan may be inserted using one or more neural networks. The detection system can then insert watermark circuits connected to the identified locations.

20 Claims, 10 Drawing Sheets

(56) References Cited

OTHER PUBLICATIONS

Choudhari et al., “DAWN: Efficient Trojan Detection in Analog Circuits Using Circuit Watermarking and Neural Twins”, IEEE Transactions on Computer-Aided Design of Integrated Circuits and Systems, vol. 43, No. 10, Apr. 2, 2024, pp. 2930-2943.
International Search Report and Written Opinion, Mailed on Apr 29, 2025 for WO Application Number PCT/US25/012126, 11 page(s).
Kelly et al., “Detecting Hardware Trojans using On-chip Sensors in an ASIC Design”, Journal of Electronic Testing, vol. 31, No. 1, Feb. 20, 2015, pp. 11-26.

* cited by examiner

DETECTION OF MALICIOUS CIRCUITS INSERTED IN ANALOG CIRCUITS

TECHNICAL FIELD

The present disclosure generally relates to detecting malicious circuits inserted into analog circuits.

BACKGROUND

Malicious circuits, or Trojans, may be inserted by third parties as security threats to integrated circuits. Security threats posed by these Trojans include modifying the circuit into which it is inserted (e.g., to grant a third party control over the circuit) or leaking signals produced by the circuit (e.g., transmitting confidential information to a third party). Third parties may attempt to insert Trojans into an analog circuit at either the design or fabrication stages. Trojans may remain inactive until triggered by a condition or may remain active at all times. In digital circuits, Trojans can be triggered by a particular sequence of bits. However, in analog circuits, the continuous nature of signal values and process variations makes the trigger harder to predict. In addition, due to their small area footprints, Trojans are easy to embed without detection in a design netlist or chip layout. Moreover, such small Trojans are hard to detect when inserted in large circuits with hundreds of components and paths. A Trojan can be inserted in one of the less sensitive paths and triggered by a subtle change in the voltage level across that path.

Some approaches use physical analysis techniques (e.g., scanning electron microscopy (SEM) or focused ion beam) to detect the presence of malicious circuitry or other anomalies in a fabricated chip. However, these methods are costly and require comparison with a reference circuit. Generating a reference circuit can be challenging due to the significant time and design expertise required. Although the SEM-based detection techniques can identify malicious modifications, they are often expensive as well as destructive.

SUMMARY

In one aspect, a Trojan detection system identifies, using one or more neural networks, a node in a design of an analog circuit as insensitive based on whether a functional signal path through the insensitive node to an output pin is insensitive to voltage changes at the insensitive node caused by a malicious circuit connected to the insensitive node. The Trojan detection system then inserts a watermark system connecting the insensitive node to a watermark output pin, wherein voltage changes at the insensitive node caused by the malicious circuit are observable at the watermark output pin.

In another aspect, an analog circuit includes channel connected blocks (CCBs) and a watermark system. The watermark system includes a watermark circuit and a watermark output pin. The watermark circuit is connected to an insensitive node between a pair of the CCBs. The watermark circuit passes a voltage signal at the insensitive node through to a watermark aggregator circuit connected to the watermark circuit. The watermark output pin is coupled to the watermark aggregator circuit. A measurement at the watermark output pin changes based on whether a malicious circuit is inserted at the insensitive node.

In yet another aspect, a system includes an analog circuit under test (CUT), one or more processors, and a non-transitory computer readable medium. The analog CUT includes one or more CCBs. The non-transitory computer readable medium includes stored instructions which, when executed by the one or more processors, causes the one or more processors to measure a voltage at a watermark output pin connected to the analog CUT. The watermark output pin is connected, via a watermark circuit, to an insensitive node in the analog CUT. The instructions, when executed by the one or more processors, further cause the one or more processors to determine that a malicious circuit is connected to the watermark circuit based on the measured voltage at the watermark output pin.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
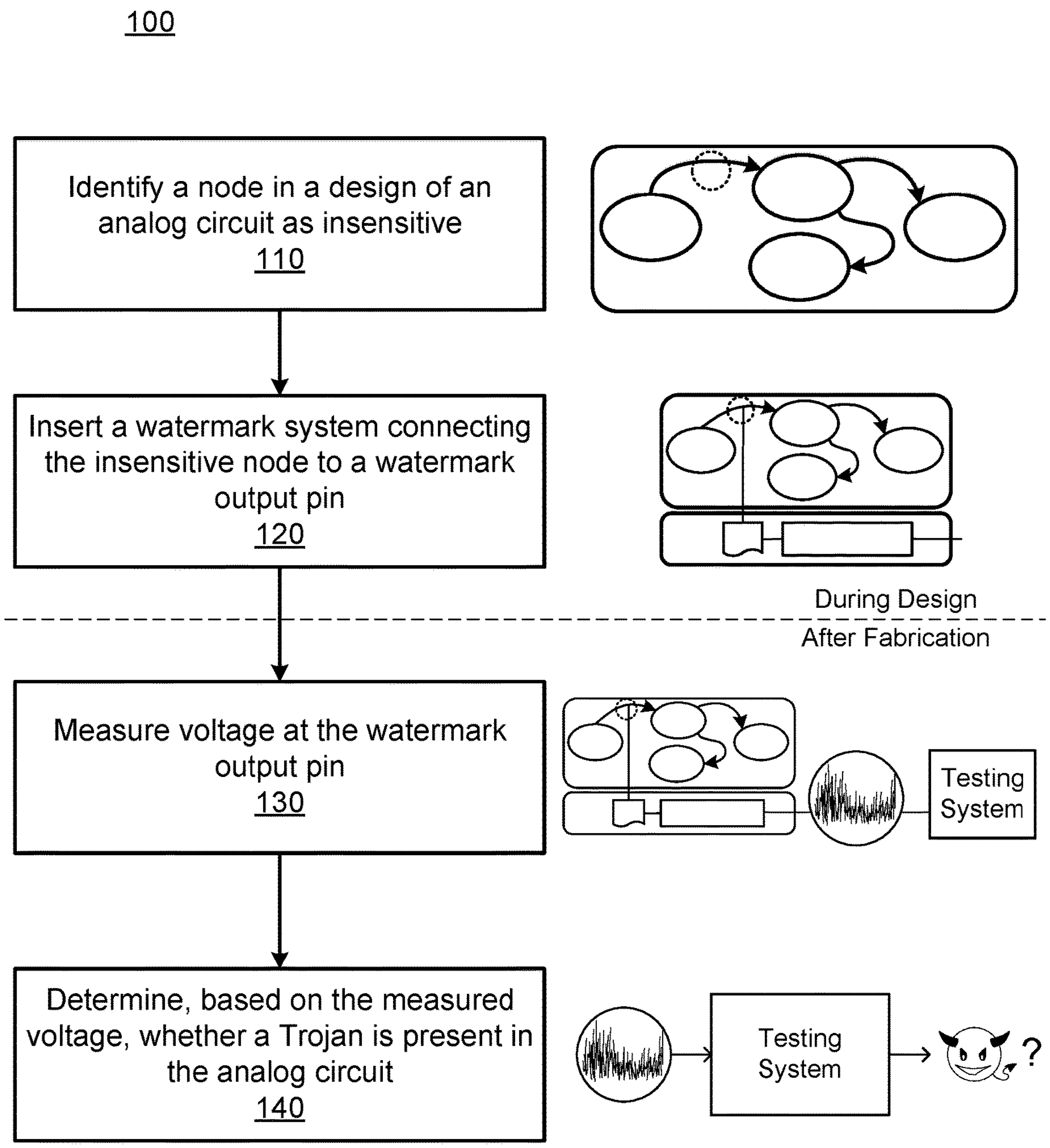
FIG. 1 is a flow diagram of a process for detecting a Trojan in an analog circuit, in accordance with some embodiments of the present disclosure.

Aspects of the present disclosure relate to the detection of malicious circuits inserted in analog circuits. The detection system places "watermarks" within an analog circuit design. The watermarks allow the system to observe a node within a circuit under test (CUT) that is otherwise not observable. The watermark can be a pass transistor logic (PTL)-based connection between the node and a readable output pin (i.e., a "watermark output pin"). In particular, the watermarks can be inserted at a node where an otherwise undetectable Trojan is more likely to be inserted. Thus, the watermarks provide a manner for observing changes (e.g., voltage changes) caused by a malicious modification to an analog circuit design.

The detection system may use machine learning to identify which nodes within a circuit may be candidates for Trojan insertion. For example, rather than a high level determination that a circuit is likely to be susceptible to Trojan insertion, the detection system can identify which individual nodes within the circuit are likely to be potential locations for Trojan insertion.

First, the detection system identifies nodes in an analog circuit design where Trojans, also referred to as "malicious circuits," may be inserted. Examples of malicious circuits include an A2 Trojan or a trickle charge (TC)-based Trojan. To identify these nodes, the detection system analyzes the analog circuit design for paths that are less sensitive to changes in input voltage relative to other paths. An attacker is more likely to insert a malicious circuit at a node on a less sensitive path because the lower sensitivity reduces the likelihood that the modification will be detected. Hence, these nodes are referred to as "insensitive nodes" due to the sensitivity characteristic of the path on which they are located. The detection system can identify insensitive nodes using machine learning. In particular, the detection system can generate a neural network to function as a twin for a given transistor in the analog circuit design. The neural network representation models the given transistor and enables quick identification of potential locations for malicious circuits. By using neural network representations of transistors, the detection system improves this identification over a sensitivity analysis that does not use neural networks, which can be expensive and impractical for large circuits.

After identifying nodes where Trojans are likely to be inserted, the detection system connects a watermark circuit to the identified nodes. The watermark circuit is connected to an observable watermark output pin. The watermark circuit is designed to leave functional signal (i.e., signals of the analog circuit that contribute to its function) output pins undisturbed. For example, a watermark circuit may be composed of PTL-based watermarks and a cascaded differential amplifier that are connected to insensitive nodes by separate paths from the functional signal paths.

After the analog circuit is fabricated, the detection system may be used to identify inserted Trojans during run-time of the analog circuit by analyzing measurements taken at the watermark output pin. The detection system can apply a machine learning model to determine if the measurements reflect normal circuit operation or an unauthorized modification to the circuit (i.e., insertion of a Trojan).

Advantages include but are not limited to the following. The watermark system used by the detection system may consume low power and incur low area overhead in terms of transistor count while providing efficient detection of analog Trojans during operation of the circuit. Watermark circuits in the watermark system can have a low impact on an analog circuit's functionality in terms of output current-voltage (IV) characteristics and frequency response. The detection system preferably uses watermark circuits having a small area overhead. For example, a watermark circuit may be composed of only two transistors. Moreover, the watermark circuit is robust to process variations in the CUT. The watermark circuit does not introduce unwanted voltage deviation in the output nodes of the circuit that affects the analog circuit's operation.

In more detail, FIG. 1 is a flow diagram of a process 100 for detecting a Trojan in an analog circuit, in accordance with some embodiments of the present disclosure. The process 100 is performed across different stages of the lifetime of the analog circuit. For example, the detection system can insert a watermark system during the design stage of an analog circuit and use the inserted watermark system to determine if a Trojan is present in the analog circuit after the circuit is fabricated.

Before the analog circuit design is provided to a third party who may be a malicious actor, or "attacker," the analog circuit design can be equipped with a watermark system that helps detect the existence of Trojans after the analog circuit design is provided to an attacker. The detection system determines locations in the analog circuit design at which a third party attacker may insert malicious circuits. Attackers are likely to insert a malicious circuit at an insensitive node because a functional signal path at which the insensitive node is located is less sensitive to voltage changes caused by malicious circuit that is active and operating (i.e., as opposed to dormant or not triggered).

Hence, at 110, the detection system identifies a node in the design of the analog circuit as insensitive. The detection system may use one or more neural networks to identify 110 the insensitive node. Each neural network may act as a representation of a transistor, predicting I-V characteristics of the transistor. At 120, the detection system then inserts a watermark system connecting the insensitive node to a watermark output pin. Components of the watermark system, described further with respect to FIGS. 3-5, allow the effects of Trojans (e.g., voltage changes caused by a Trojan at an insensitive node) to be observable at the watermark output pin.

After the analog circuit and the watermark system inserted therein have been fabricated, at 130, the detection system measures a voltage at the watermark output pin. The measured voltage may be reflective of an activated Trojan's operation within the fabricated analog circuit. At 140, the detection system determines, based on the measured voltage, whether a Trojan is present in the analog circuit. For example, the detection system can apply a machine learning model to the measured voltage, where the machine learning model is trained to classify signals as representative of a Trojan or not representative. Thus, the detection system may apply machine learning both during the design stage (e.g., using neural network representations of transistors to identify insensitive nodes) and after the analog circuit is fabricated (e.g., using machine learning to classify whether a Trojan is present in the analog circuit).

Figure 2:
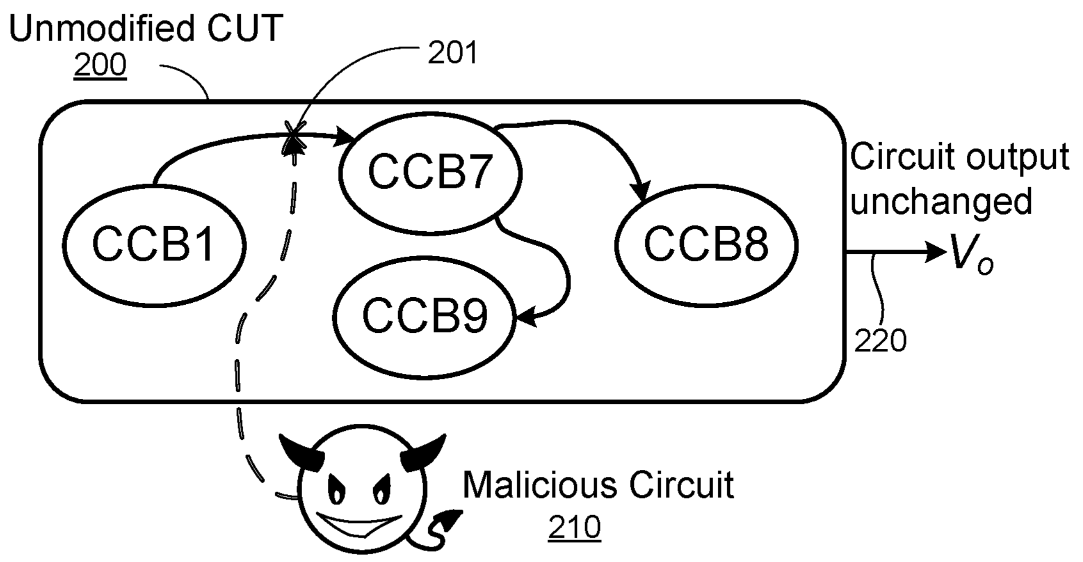
FIG. 2 is a diagram of an unmodified circuit under test (CUT) into which a malicious circuit is inserted, in accordance with some embodiments of the present disclosure.

FIG. 2 is a diagram of an unmodified CUT 200 into which a malicious circuit 210 is inserted, in accordance with some embodiments of the present disclosure. A CUT is composed of one or more logic blocks connected by routing channels. These logic blocks connected by routing channels are referred to as channel connected blocks (CCBs). The logic blocks include one or more logic cells. Logic cells, logic blocks, and CCBs may be referred to as circuitry. Each CUT may have at least one primary input (PI) and primary output (PO). Inputs and outputs between CCBs may be referred to as intermediate inputs and outputs, respectively. In this particular example, the CUT 200 contains at least nine CCBs although not all nine are depicted. CCB1 is connected by a routing channel to CCB7, and the malicious circuit 210 is inserted at node 201 of this routing channel between CCB1 and CCB7. A path between PI and PO of the CUT 200 includes the connection between CCB1 and CCB7, and the output signal of that path is $V_o$. The output voltage, $V_o$, is read at a functional output pin 220.

The unmodified CUT 200 is a CUT without any watermark circuit for identifying the presence of the malicious circuit 210 in the CUT 200. After the malicious circuit 210 is inserted in the unmodified CUT 200, the voltage output $V_o$ at the PO of the CUT 200 is unchanged relative to the output before the malicious circuit 210 was inserted. The functional signal path from PI to PO through channel blocks CCB1 and CCB7 has low sensitivity to the insertion of the malicious circuit 210 at node 201. As a result, the malicious circuit 210 can remain undetected after insertion. Even when triggered into activation, the malicious circuit 210 may leave $V_o$ unchanged and remain undetected while executing undesirable operations (e.g., providing unauthorized third parties access to proprietary signals of the CUT).

Figure 3:
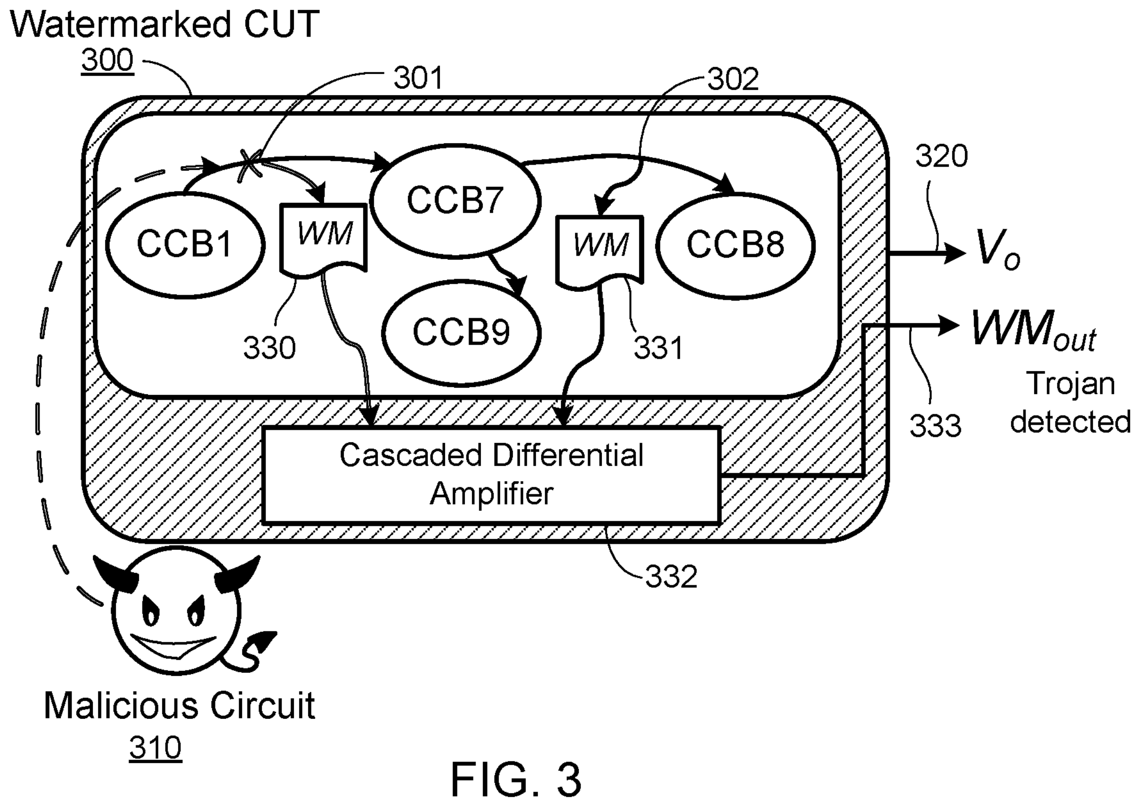
FIG. 3 depicts a watermarked CUT, in accordance with some embodiments of the present disclosure.

FIG. 3 depicts a watermarked CUT 300, in accordance with some embodiments of the present disclosure. The watermarked CUT 300 includes a watermark system connected to nodes 301 and 302 between CCBs of the CUT 300. The watermark system includes watermark circuits 330 and 331, a watermark aggregator circuit 332, and a watermark output pin 333. In this particular example, the watermark aggregator circuit is a cascaded differential amplifier 332. The watermarked CUT 300 enables the detection of the malicious circuit 310 because the watermark output pin 333 is a measurable output pin where changes in voltage $W\ M_{out}$ can reflect the operation of the malicious circuit 310 when activated. The voltage at the watermark output pin 333 may reflect both the presence of active and inactive Trojans. For example, an inactive Trojan may cause load changes at insensitive nodes, and the watermark system can detect these changes. As depicted in FIG. 3, the malicious circuit 310 is inserted at the same node as in FIG. 2 and will be connected to the watermark circuit 330 via a separate path (i.e., the wire from the insensitive node 301 to the watermark 330 is not a wire leading to a functional signal's output pin). However, unlike in FIG. 2, while the malicious circuit 310 will not affect the $V_o$ at the functional output 320, the malicious circuit 310 will affect the voltage $W\ M_{out}$ at the watermark output pin 333.

The watermark circuits 330 and 331 are connected to nodes in the analog circuit design where a malicious circuit is likely to be inserted. The watermark circuits 330 and 331 may be implemented using pass transistor-based transmission gates. The use of PTL is described further with respect to FIG. 4. In some embodiments, the watermark circuits 330 and 331 may be replaced by a wire directly from the insensitive node to the watermark aggregator circuit. Relative to these direct wires, the watermark circuits 330 and 331 may provide electrical separation between the insensitive node and the watermark aggregator circuit. This separation minimizes the impact of the watermark aggregator circuit on normal operation of an analog circuit.

Figure 5:
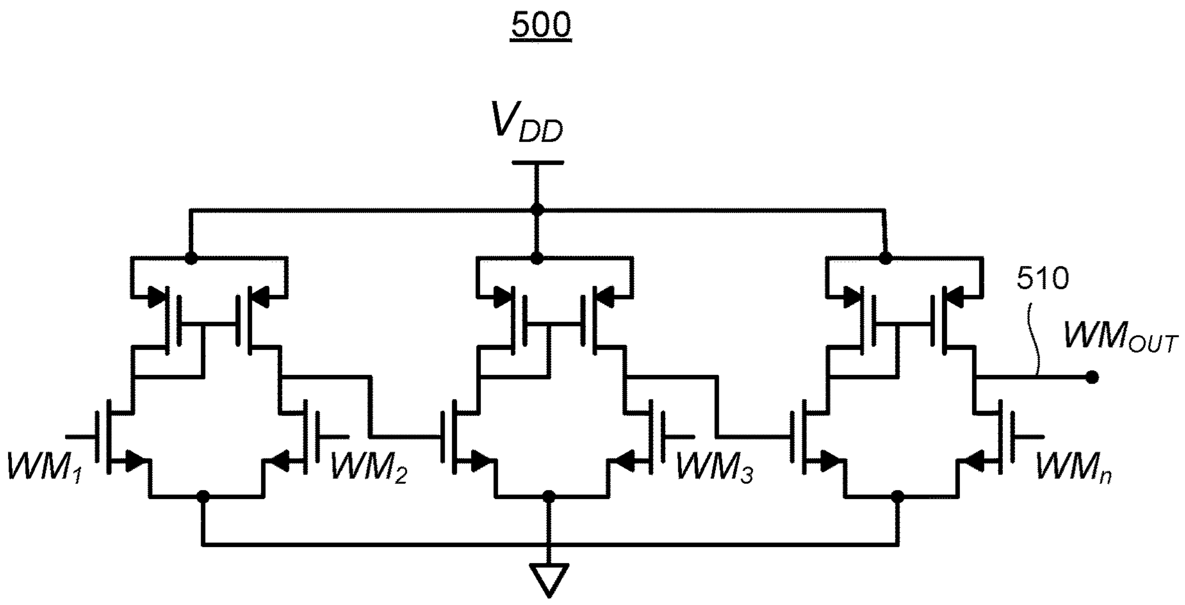
FIG. 5 depicts a cascaded differential amplifier as a watermark aggregator circuit, in accordance with some embodiments of the present disclosure.

The watermark aggregator circuit receives the output of the watermarks. As depicted in FIG. 3, the cascaded differential amplifier 332 is the watermark aggregator circuit that receives outputs from the watermarks 330 and 331. The watermark aggregator circuit may take other forms besides a cascaded differential amplifier including, but not limited to, an analog adder circuit or any other suitable circuit that does not affect the sensitivity of functional signal paths. One example configuration of a cascaded differential amplifier is shown in FIG. 5, as described in more detail below. The watermark system is connected to nodes in the CUT 300 during the design stage of the CUT 300. That is, during the design stage of the analog circuit, the detection system identifies nodes where the malicious circuit 310 is likely to be inserted and adds the watermark system to the analog circuit design, connecting the watermark circuits 330 and 331 to the insensitive nodes 301 and 302. The identification of insensitive nodes is further described with respect to the descriptions of FIGS. 6 and 7.

Figure 15:
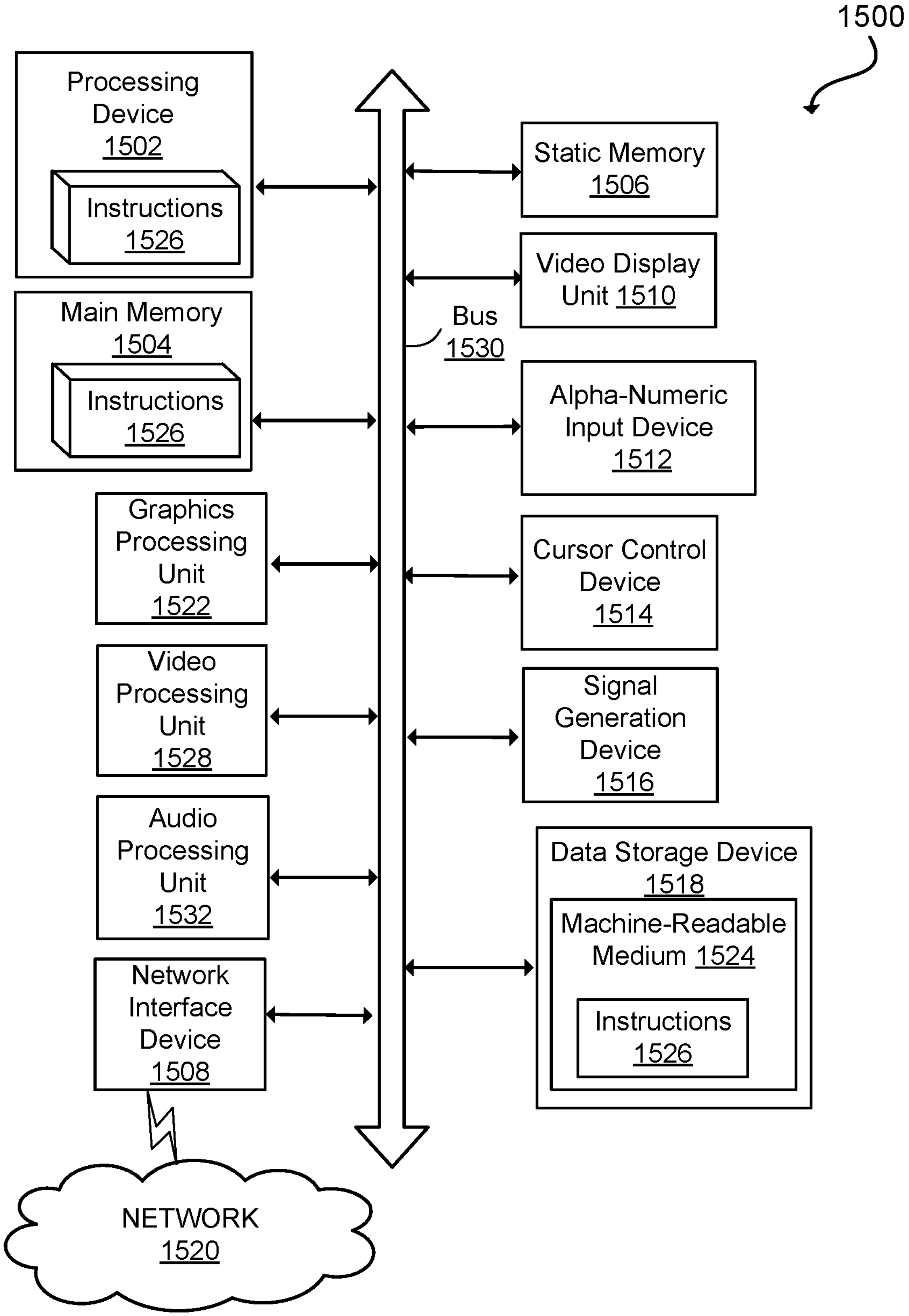
FIG. 15 is a block diagram of an example computer system in which embodiments of the present disclosure may operate.

After the watermark system is connected during a phase of the design of the CUT 300, the design may continue along its production process to be sent to a third party who continues the design or assists in other phases of the production process (e.g., one of the stages shown in FIG. 15). Undesirably, this third party may insert a malicious circuit at one of the insensitive nodes. The malicious circuit 310 may be inserted during a later phase in the design stage or during fabrication of the CUT 300. By measuring the watermark output pin 333, the detection system can determine whether the malicious circuit 310 has been inserted or not. The watermarked CUT 300 has two output pins: functional output pin 320 and watermark output pin 333. The functional output pin 320 represents the primary output of the analog CUT 300 and provides the desired circuit functionality. The watermark output pin 333 represents a combination of watermark outputs that are obtained by placing watermarks at the insensitive nodes. The watermark output pin detects stealthy Trojan insertion even if the insertion is not reflected in the functional output pin 320.

Figure 4:
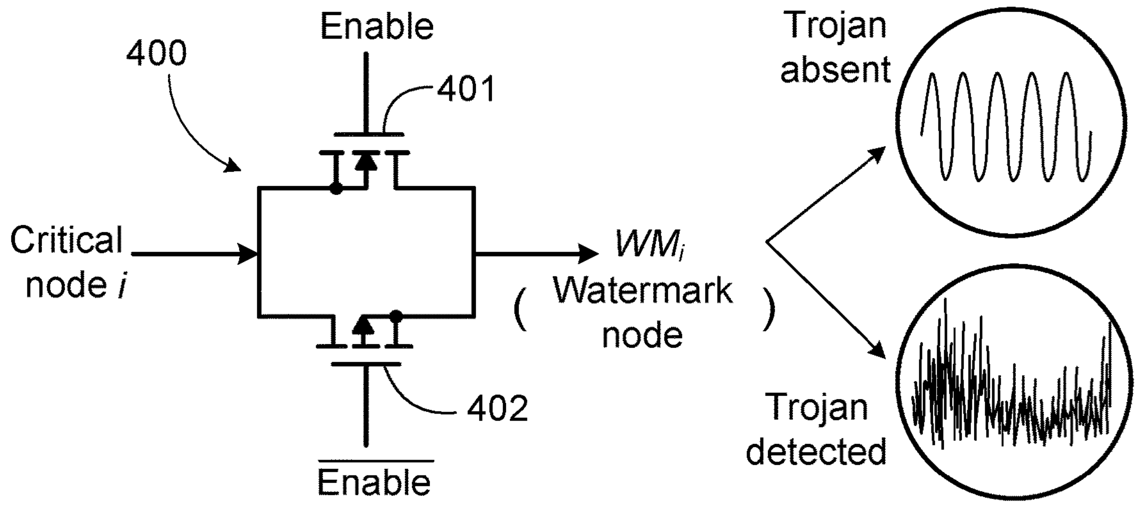
FIG. 4 depicts a watermark circuit based on pass transistor logic (PTL), in accordance with some embodiments of the present disclosure.

FIG. 4 depicts a watermark circuit 400 based on PTL, in accordance with some embodiments of the present disclosure. The watermark circuit 400 is composed of a combination of an N-channel metal-oxide semiconductor (NMOS) transistor 401 and a P-channel metal-oxide semiconductor (PMOS) transistor 402 to allow signals to pass through when the "Enable" signal is activated (i.e., $V_{Enable}=V_{DD}$). "Enable" is a control signal connected at the gate of the NMOS transistor 401 and the inverse of "Enable" is a control signal connected at the gate of the PMOS transistor 402. The drain of the NMOS 401 and the drain of the PMOS 402 are connected to the node of the CUT at which a malicious circuit is likely to be inserted, insensitive node i. The source of the NMOS 401 and the source of the PMOS 402 are connected to the watermark aggregator circuit (e.g., a cascaded differential amplifier). The node between the watermark circuit 400 and the watermark aggregator circuit is the watermark node, $WM_i$.

Under normal operation of a Trojan-free analog circuit, the output of the insensitive node i will pass through the input of the watermark circuit 400. The detection system can use this Trojan-free (TF) watermark output, $$WM_i^{TF},$$

as a reference to detect unauthorized, malicious modifications in the CUT. The detection system further processes the watermark output, $$WM_i^{TF},$$

at the watermark aggregator circuit to generate the voltage at the watermark output pin, $$WM_{OUT}^{TF}.$$

After the Trojan has been activated, the change in voltage at the insensitive node caused by the Trojan passes through the input of the watermark circuit 400 and is detected at the final watermark output pin having voltage $WM_i$. The detection system can use the watermark output pin to continuously monitor circuit operation, detecting Trojan with large-delay triggers (i.e., activated only after a long period of time) such as a trickle charge (TC) Trojan.

In some embodiments, "Enable" is kept activated during normal operation of the CUT so that outputs of the insensitive nodes pass through the watermark and are captured at the watermark output pin. In other words, $V_{out}=V_{in}$, $V_{Enable}=V_{DD}$, where $V_{out}$ and $V_{in}$ are the input and output of the watermark circuit 400. However, keeping the gate activated for the entire duration of the detection process may cause leakage of current from the gate to the intermediate nodes (i.e., nodes between PI and PO) of the CUT, leading to unwanted voltage deviations in these nodes. To prevent current from leaking to the intermediate nodes, the NMOS transistor 401 and the PMOS transistor 402 can be sized to operate in the saturation range. The transmission gate behavior for the PTL region of operation is as follows: for both PMOS (having threshold voltage $V_{t,p}$) and NMOS (having threshold voltage $V_{t,n}$) transistors to operate in the saturation range, $V_{gs,p}<V_{t,p}$ and $V_{gs,n}>V_{t,n}$, where $V_{gs,p}$ and $V_{gs,n}$ are the gate-to-source voltages of the PMOS and NMOS transistors, respectively.

The watermark circuit 400 has a low impact on the CUT's functionality in terms of output current-voltage (IV) characteristics and frequency response. Additionally, the detection system preferably uses watermarks having a small area overhead. For example, the watermark circuit 400 is composed of only two transistors. Moreover, the watermark circuit 400 is robust to process variations in the CUT. The watermark circuit 400 does not introduce unwanted voltage deviation in the PO nodes of the circuit that affects the circuit operation.

FIG. 5 depicts a cascaded differential amplifier 500 as a watermark aggregator circuit, in accordance with some embodiments of the present disclosure. The cascaded differential amplifier 500 is a configuration of multiple differential amplifier stages connected in series. The cascaded differential amplifier 500 amplifies voltages of individual watermark nodes. This amplification improves the strength of the watermark signals (i.e., the measurements at the watermark nodes), making changes in voltages caused by activated Trojans more discernible. The voltage $WM_{OUT}$ at the watermark output pin 510 is a combination of the measurements of various watermark nodes. The watermark signals (e.g., voltage signals), $WM_1$ through $WM_n$, for each of n watermark nodes are input to respective differential amplifier inputs.

The signal passing through the series of differential amplifiers is progressively amplified, and this amplification benefits Trojan detection by amplifying subtle disturbances caused by the Trojan when it is activated. For a particular CUT having n identified nodes where malicious circuits may be inserted, an optimal number of stages of the cascaded differential amplifier 500 is given by $\lceil \log_2 n \rceil + k$, where k is a constant that can be fine-tuned based on the desired performance of the specific circuit being watermarked (i.e., the act of identifying locations to place connections to the watermark circuit and placing the watermark circuit accordingly).

Figure 6:
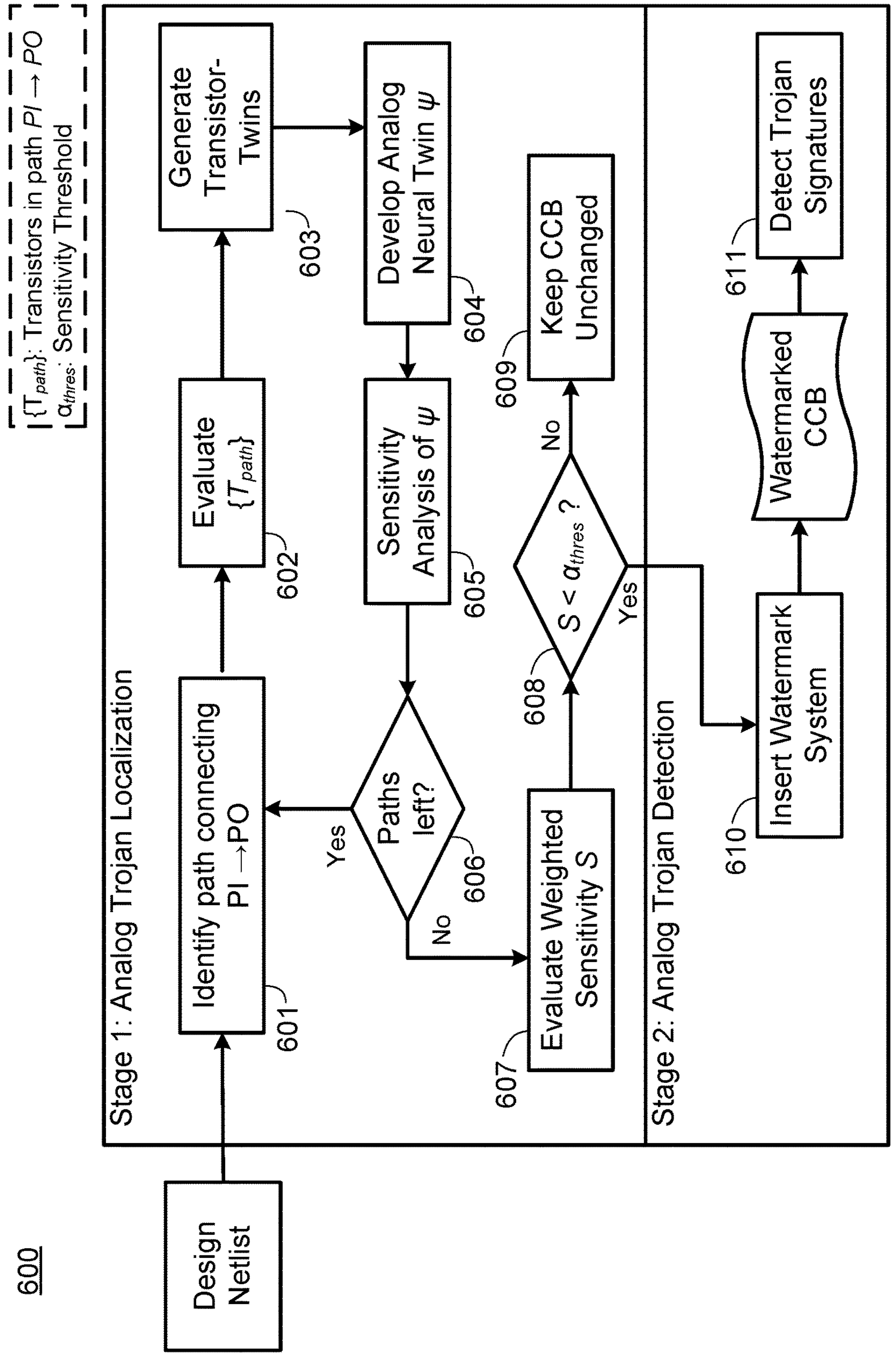
FIG. 6 is a flow diagram of a two-stage analog Trojan detection framework, in accordance with some embodiments of the present disclosure.

FIG. 6 is a flow diagram of a two-stage analog Trojan detection framework 600, in accordance with some embodiments of the present disclosure. In the first stage, the detection system identifies potential locations (nodes) in the CUT where a Trojan may be inserted. This process of identifying locations may also be referred to as "localization." In the second stage, the detection system inserts the watermark circuit and connects the watermark circuit to the locations (nodes) identified in the first stage. Each of the two stages may occur across one or more design stages of a circuit (e.g., the stages shown in FIG. 15). For example, a watermark may be embedded into a CUT during fabrication while Trojan signatures can be detected after the CUT is already manufactured. The two-stage framework 600 may be performed at the CCB-level. That is, for each CCB in a CUT, the detection system performs localization & detection.

At the first stage, the detection system receives a design netlist for a CUT. From the design netlist, the system can identify CCBs of the CUT. Additionally, the system can identify the PI's and PO's of the CCB from the design netlist. At 601, the system identifies a path connecting a PI to a PO. The system can identify a path connecting PI to PO using a directed acyclic graph (DAG). The DAG is a graph that has forward edges from one node to another without the presence of cycles. The detection system starts by identifying intermediate transistors connected to the drain of the first transistor whose input is PI (i.e., the PI transistor). As those intermediate transistors are identified, the detection system builds the DAG until the detection system determines that a drain of an intermediate transistor is connected to the gate of a transistor whose output is PO (i.e., the PO transistor).

The detection system may encounter multiple paths that connect the PI transistor to the PO transistor. For a path $Path_i$, $1 \le i < m$, the detection system generates a list $L_i$ that includes the transistors present in $Path_i$. Cyclic paths are less relevant for identifying Trojans because the sensitivity values of these paths are influenced by intermediate nodes present in the cyclic path. For example, if the detection system determines that a PO of a CCB, which is also connected to a cyclic path within the CCB, is insensitive, the nodes within this cyclic path (i.e., the intermediate nodes in the cyclic path) are likely to be insensitive. The detection system can insert a watermark circuit at the PO that allows the system to detect a Trojan inserted at the PO and at the intermediate nodes in the cyclic path before the PO. Alternatively, if the detection system determines that a PO of a CCB, which is connected to a cyclic path within the CCB, is sensitive, the nodes within this cyclic path are also likely to be sensitive. The detection system can skip connecting a watermark circuit at any of these sensitive nodes. Hence, these feedback loops do not provide relevant information about the presence of a Trojan in a circuit.

At 602, the detection system evaluates the transistors on the path from PI to PO, $\{T_{path}\}$, by identifying the sequence of transistors from PI to PO using the design netlist. At 603, for each of the transistors on the path, the detection system generates a transistor twin (e.g., a field effect transistor (FET) twin). Each transistor-twin may be a neural network representation of a metal oxide semiconductor FET (MOSFET). That is, each transistor-twin may simulate the IV characteristics of a transistor. The transistor-twin may generate drain current ($I_D$) and/or output voltage ($V_{DS}$) values for a specific transistor. The detection system may generate two types of transistor-twins: a current-based transistor-twin, $\Phi_{I_D}$, or a voltage-based transistor-twin, $\Phi_{V_{DS}}$. The $\Phi_{I_D}$ transistor-twin may predict the drain current for a transistor based on its input gate voltage ($V_G$) and the PI's of the CUT. The $\Phi_{V_{DS}}$ transistor-twin may predict the output drain voltage $V_{DS}$ of a transistor based on $V_G$ and the PI's of the CUT. The detection system may train the transistor-twins. One embodiment for training a transistor-twin is described with respect to FIG. 6. The detection system may generate $\Phi_{I_D}$ and $\Phi_{V_{DS}}$ transistor-twins for the last transistor along a path from PI to PO (i.e., the PO transistor). The detection system may generate only a $\Phi_{V_{DS}}$ transistor-twin for the first transistor along the path from PI to PO (i.e., the PI transistor). Similarly, the detection system may generate only $\Phi_{V_{DS}}$ transistor-twins for transistors between the PI and PO transistors (i.e., intermediate transistors).

At 604, the detection system develops an analog neural twin $\psi$ for the identified path connecting a PI to a PO by connecting the generated transistor-twins accordingly (e.g., in a forward, non-cyclic sequence of the transistors from PI to PO). At 605, the detection system calculates the sensitivity of the analog neural twin y for the path between PI to PO. That is, the detection system calculates the path sensitivity $$\delta_{path} = \frac{\Delta V_{out}}{\Delta V_{in}},$$

where $\Delta V_{out}$ is the change in the original PO voltage $V_{out}$ when the PI voltage $V_{in}$ changes by $\Delta V_{in}$. The sensitivity value represents the effect of a small change in the PI voltage value on the output voltage of the CUT. Paths with low sensitivity values are more susceptible to stealthy Trojan insertion, as the Trojan does not significantly impact the circuit performance and remains undetected during design verification. An attacker may insert analog Trojans in these paths, where the Trojans are activated only during rare trigger conditions. Hence, sensitivity analysis is useful for detecting nodes at the CUT where a malicious circuit may be inserted.

The detection system may determine multiple sensitivity values for a single path by calculating sensitivities across a range of test input voltages (e.g., from 0 Volts (V) to 5 V in increments of 0.1 V). For example, the detection system sweeps test input voltages as inputs to the analog neural twin $\psi$ for a particular path to determine sensitivities for that path.

At 606, the detection system may determine whether there are paths left for which to perform a sensitivity analysis. Until the detection system has analyzed the path sensitivities for all possible paths between PIs and POs of the CUT, the detection system may repeat identifying a path connecting a PI to a PO, identifying transistors along the path, generating transistor-twins along the path, developing an analog neural twin for the path, and analyzing the sensitivity of the path. The detection system may avoid regenerating transistor-twins for transistors for which it has previously generated transistor-twins.

At 606, after the detection system determines that no paths are left for which to analyze sensitivity, the detection system, at 607, may determine a weighted sensitivity. In one embodiment, the weighted sensitivity may be calculated as an average of the calculated path sensitivities. The detection system may determine a single weighted sensitivity using the path sensitivities calculated across a sweep of input voltages or separate weighted sensitivities for respective input voltages. At 608, the detection system compares the weighted sensitivity of the CCB to a sensitivity threshold, $\alpha_{thres}$. In a circumstance where the detection system has calculated multiple weighted sensitivities for different input voltages, the system may compare each weighted sensitivity to the sensitivity threshold and if any one of the weighted sensitivities are less than the sensitivity threshold, the system may proceed to insert a watermark at the CCB. The detection system may calculate a different $\alpha_{thres}$ for each CCB. The detection system may determine, the sensitivity threshold by sorting the path sensitivities based on the test input voltage used to determine the path sensitivities. The detection system may then identify one or more clusters of these sorted path sensitivities. The detection system determines a boundary of a cluster and uses the determined boundary to obtain the sensitivity threshold. In some embodiments, the sensitivity threshold can vary based on the test input voltage to a path. Alternatively, the sensitivity threshold can be determined as a fixed value using the boundary (e.g., the sensitivity threshold is the maximum sensitivity value of the boundary). One embodiment of a identifying a sensitivity threshold is described with respect to FIG. 7.

If the detection system determines that the weighted sensitivity is greater than or equal to the sensitivity threshold, the system, at 609, leaves the CCB unmodified (i.e., the detection system will not place and connect a watermark circuit in the CCB). Nodes along paths with sensitivity values at or above $\alpha_{thres}$ are classified as "benign nodes." If the detection system determines that the weighted sensitivity is less than the sensitivity threshold, the system proceeds to the second stage to detect malicious circuits. Nodes along paths having sensitivity values lower than $\alpha_{thres}$ are classified as "Trojan hotspots" or insensitive nodes. Nodes that belong to multiple paths, where one path has a sensitivity value at or above $\alpha_{thres}$ and another has a sensitivity value below $\alpha_{thres}$, are classified as insensitive nodes rather than benign nodes.

In the second stage, at 610, the detection system inserts a watermark system into the design of the analog circuit. As part of the insertion, the detection system connects watermark circuits of the watermark system to the nodes in the CUT where a malicious circuit is likely to be inserted (i.e., at a "insensitive node"). The watermark circuit can be connected at any of the following nodes: the PI of the CUT (i.e., PI nodes), PO of the CUT (i.e., PO nodes), and input and/or output nodes of the CCBs composing the CUT (i.e., intermediate nodes). The watermark circuits are not inserted directly in the functional signal path, but rather, the detection system creates a branch from the insensitive node and inserts the watermark in this separate branching path. For n insensitive paths (i.e., paths whose sensitivities are below $\alpha_{thres}$), the detection system may create at least n watermark nodes.

The detection system combines the values at each watermark node, W $M_i$, to generate a final watermarked output, W $M_{OUT}$.

The chip is then fabricated from the analog design. The detection system reads measurements at W $M_{OUT}$ from the fabricated chip to detect, at 611, the insertion of a malicious circuit. When voltage changes caused by an active Trojan contribute to the final watermarked output, W $M_{OUT}$, the measured voltage at the watermark output pin may be referred to as a "Trojan signature."

The detection system may apply a machine learning model to the measurements at the watermark output pin to determine whether a malicious circuit has been inserted at any of the insensitive nodes that have been watermarked. The machine learning model may be configured to receive a feature vector representing the measurement at W $M_{OUT}$ and operational parameters (e.g., input voltage, temperature, $V_{DD}$, clock frequency, any suitable condition affecting operation of the CUT, or a combination thereof). The operational parameters characterize a condition under which the analog circuit operates. In some embodiments, the operational parameters may be optional inputs. Based on the input, the machine learning model may be configured to output a probability that the measurement at W $M_{OUT}$ is representative of a malicious circuit inserted at the CUT. The detection system may train the machine learning model using positive samples of W $M_{OUT}$ measurements taken from a CUT with a Trojan inserted, negative samples of W $M_{OUT}$ measurements taken from the CUT without a Trojan inserted, or a combination of both.

Figure 7:
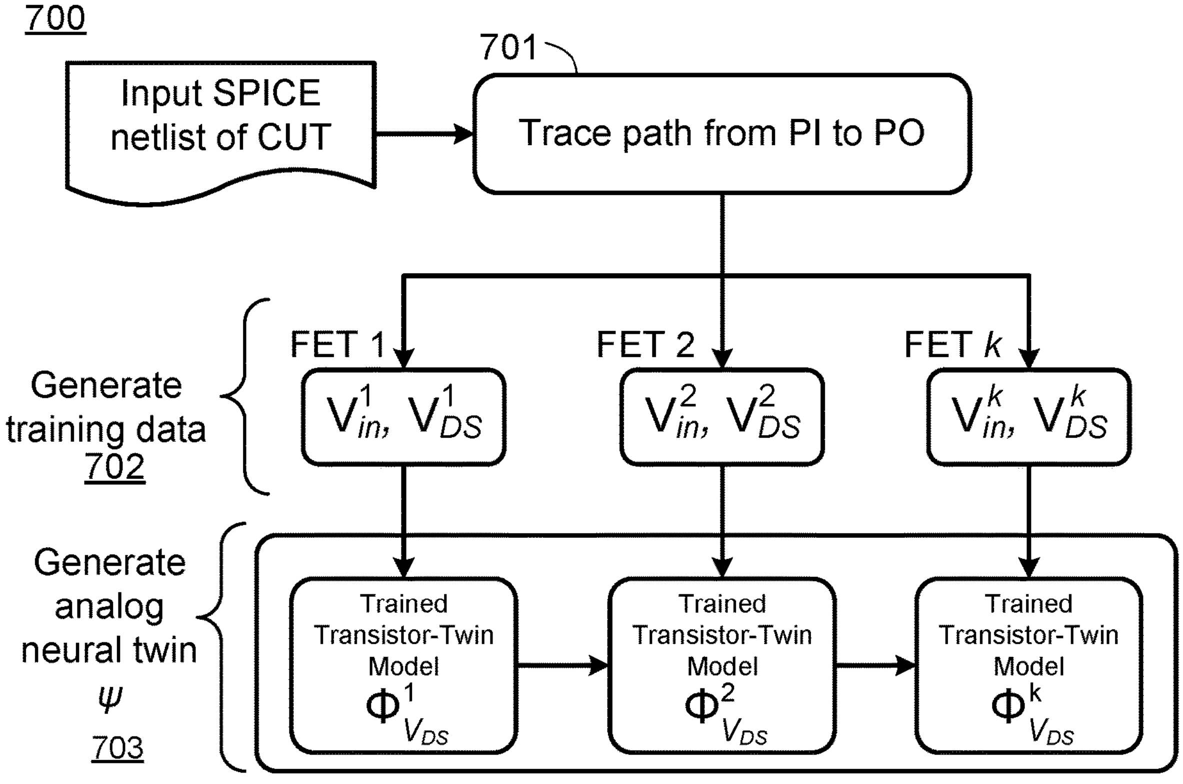
FIG. 7 depicts a flow diagram of a process for generating an analog neural twin using trained field effect transistor (FET) twins, in accordance with some embodiments of the present disclosure.

FIG. 7 depicts a flow diagram of a process 700 for generating an analog neural twin using trained transistor-twins, in accordance with some embodiments of the present disclosure. The detection system receives a netlist of the CUT (e.g., an input simulation program with integrated circuit emphasis (SPICE) netlist). At 701, the detection system traces a path from a PI of the CUT to a PO of the CUT (e.g., using a DAG). At 702, the detection system generates training data for each transistor along the path. The training data includes input voltages, $$V_{in}^{i},$$

to the $i^{th}$ transistor and corresponding output voltage, $$V_{DS}^{i},$$

for the $i^{th}$ transistor. The training data may be obtained from HSPICE simulations. In some embodiments, the detection system may train a $\Phi_{V_{DS}}$ transistor-twin using a log magnitude for $I_D$. This may improve the training accuracy and model convergence.

Using the training data, the detection system trains voltage-based transistor-twins for each transistor along the traced path. Although the depicted process 600 produces voltage-based transistor-twins, the system may similarly train current-based transistor-twins. For example, the detection system collects $I_D$ values as a function of $V_{DS}$ by sweeping $V_G$ test inputs across a range of voltage values. The collected $I_D$ values and $V_G$ test inputs are used to train a $\Phi_{ID}$ transistor-twin to predict drain current based on an input gate voltage $V_G$.

In some embodiments, the detection system may train transistor-twins based on input voltage $V_G$ and voltages at the primary inputs of the CCB. The system may generate a vector of these voltages and corresponding output drain current or output drain voltage (i.e., for $\Phi_{I_D}$ transistor-twins and $\Phi_{V_{DS}}$ transistor-twins, respectively). At 703, the detection system generates an analog neural twin 610, $\psi$, by connecting the output of one transistor-twin to the input of another according to the sequence in which their corresponding transistors were arranged in the traced path.

Figure 8:
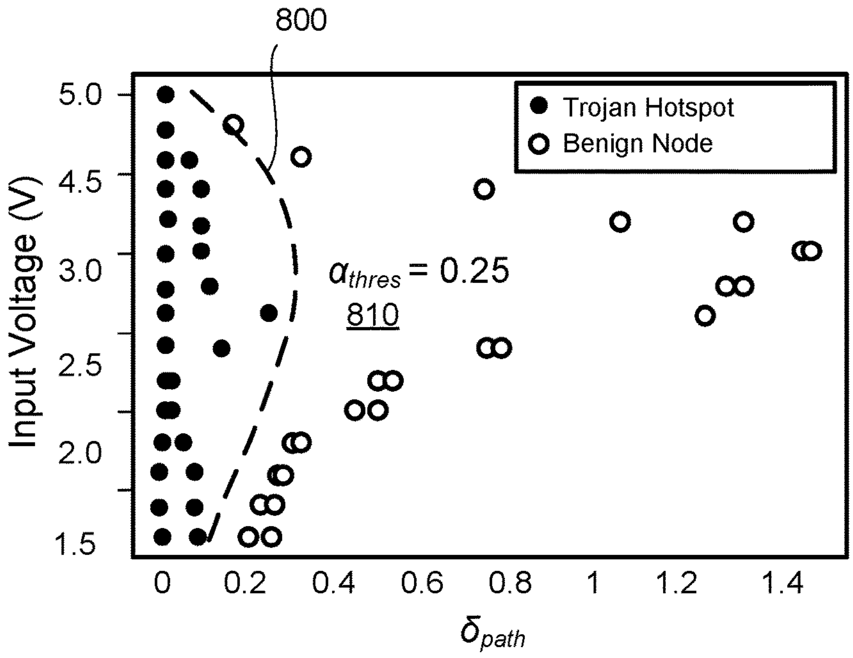
FIG. 8 depicts a graph used in identifying a sensitivity threshold, in accordance with some embodiments of the present disclosure.

FIG. 8 depicts a scatter plot of sensitivities used in identifying a sensitivity threshold, in accordance with some embodiments of the present disclosure. The detection system sorts path sensitivities determined by applying a sweep of input voltages to analog neural twins. The detection system identifies a cluster and its boundary 800. The detection system uses this boundary to determine a sensitivity threshold 810. The sensitivity threshold 810 may vary based on input voltage. For example, using the boundary 800, the detection system may determine that the sensitivity threshold is 0.25 when the input voltage is 3.0 V. Alternatively, the sensitivity threshold may be a fixed value (i.e., a single value independent of input voltage). The detection system classifies PI, PO, and intermediate input or output nodes between CCBs as either a potential location for a malicious circuit to be inserted (i.e., a Trojan hotspot or insensitive node) or not a location for the malicious circuit to be inserted (i.e., a benign node). The detection system classifies a node as a hotspot if the path sensitivity of the path to which the node belongs is below the sensitivity threshold (i.e., within the boundary 800). The detection system classifies a node as benign if the corresponding path has a sensitivity that is at or greater than the sensitivity threshold (i.e., at or beyond the boundary 800).

Figure 9:
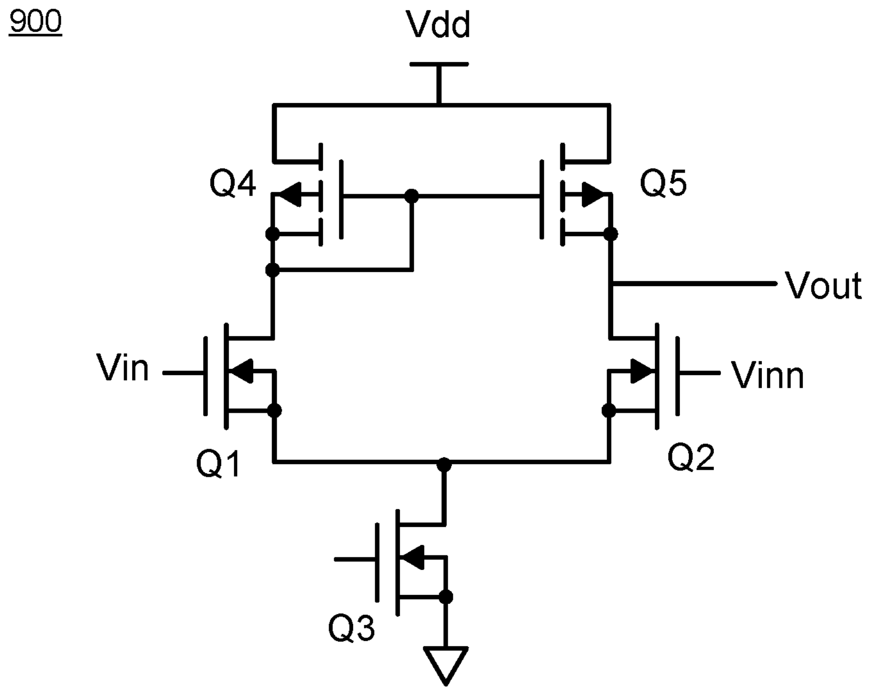
FIG. 9 depicts a single-stage differential amplifier circuit without watermarks, in accordance with some embodiments of the present disclosure.

FIGS. 9-12 show an example implementation of the two-stage detection process 600 of FIG. 6, in accordance with some embodiments of the present disclosure. FIG. 9 depicts a single-stage differential amplifier circuit 900 without watermarks. For simplicity, the circuit 900 also represents a CUT made of one CCB (i.e., the circuit 900 is both the CUT and the CCB). However, CUTs are typically more complex than the circuit 900, having multiple interconnected CCBs. The circuit 900 includes transistors Q1, Q2, Q3, Q4, and Q5. The circuit 900 has PI's of Vin, $V_{inn}$, and $V_b$. The circuit 900 has a PO of $V_{out}$. Transistors Q2 and Q5 are PO transistors while transistors Q1-Q3 are PI transistors.

Figure 10:
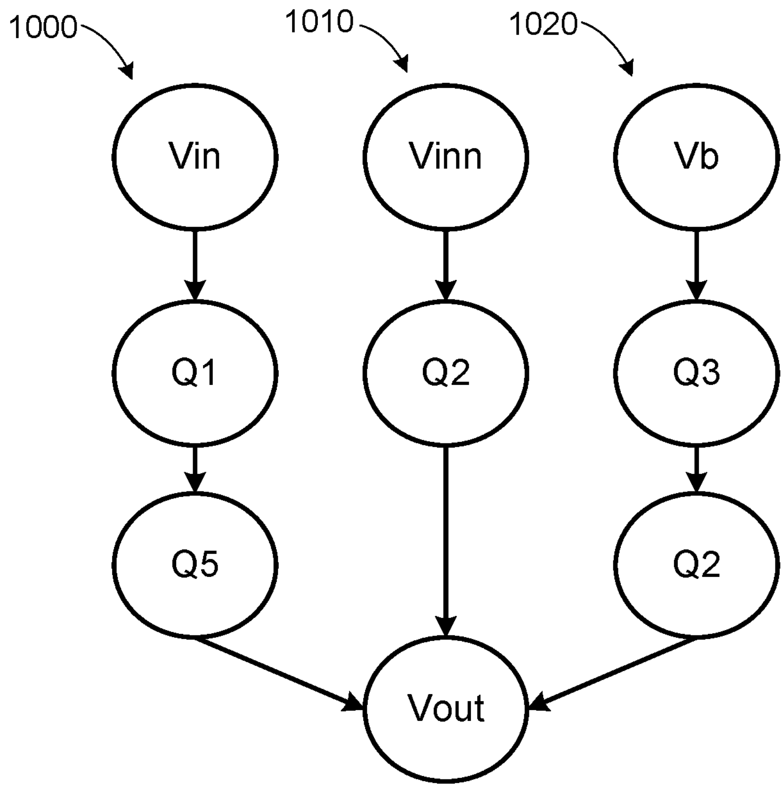
FIG. 10 shows possible paths from the primary inputs to the primary outputs of the circuit in FIG. 9, in accordance with some embodiments of the present disclosure.

FIG. 10 shows possible paths from the PI's to the PO's of the circuit 900, in accordance with some embodiments of the present disclosure. The detection system may determine these paths by constructing a DAG of the circuit. A first path 1000 is from $V_{in}$ through Q1, then through Q5, and finally to $V_{out}$. A second path 1010 is from $V_{inn}$ through Q2 and to $V_{out}$. A third path 1030 is from $V_b$ through Q3, then through Q2, and finally to $V_{out}$. The detection system may identify these three paths by constructing a DAG of the circuit 900. The detection system evaluates transistors on each path. For example, the detection system determines that the first path 1000 has transistors Q1 and Q5. The detection system generates at least one transistor-twin for each transistor on a path. For example, the detection system generates both $\Phi_{I_D}$ and $\Phi_{V_{DS}}$ transistor-twins for PO transistor Q5 and only a $\Phi_{V_{DS}}$ transistor-twin for PI transistor Q1. If the detection system had determined that there were additional transistors on the first path 1000 between Q1 and Q5, the detection system may generate only $\Phi_{V_{DS}}$ transistor-twins for these intermediate transistors.

After generating the transistor-twins of the first path 1000, the detection system determines an analog neural twin for the first path 1000 by connecting the output of the transistor-twin for Q1 to the input of the transistor-twin for Q5. For example, the predicted $V_{DS}$ for Q1 is used as an input for determining the $V_{DS}$ at Q5.

The detection system performs a sensitivity analysis using the analog neural twin for the first path 1000. For example, the detection system may sweep the value of $V_{in}$ along 0 V to 5 V and determine the corresponding values of $V_{out}$ using the IV characteristics predicted by the transistor-twins of Q1 and Q5. The detection system determines the sensitivities of the first path 1000 based on $$\frac{\Delta V_{out}}{\Delta V_{in}}.$$

The detection system may then determine if there are other paths in the single stage differential amplifier circuit on which a sensitivity analysis has not yet been performed. The detection system may similarly generate transistor-twins for transistors along the second and third paths and generate analog neural twins for the second and third paths. After the detection system determines the sensitivities of all three paths, the detection system determines a weighted sensitivity for the three paths (e.g., by calculating an average). The system compares the weighted sensitivity to a sensitivity threshold of the circuit. The detection system may determine the sensitivity threshold of the circuit by sorting the sensitivities of the circuit by input voltage, clustering the sorted sensitivities, and determining a boundary based on the clusters. The detection system may determine sensitivity thresholds as a function of input voltage.

If the detection system determines that the weighted sensitivity is greater than or equal to the sensitivity threshold, the detection system does not insert a watermark system into the design of the single stage differential amplifier circuit. If the detection system determines that the weighted sensitivity is less than the sensitivity threshold, the detection system proceeds to the second stage where the watermark system is inserted, and Trojans can be detected. The detection system may connect a watermark circuit to a node identified to be a likely location for a malicious circuit to be inserted by a third party. The detection system can identify any PI node or PO node on a path having sensitivity lower than the sensitivity threshold as an insensitive node. For example, the detection system can identify the gate of Q1 as an insensitive node in response to determining that the first path 1000 has a sensitivity value lower than the sensitivity threshold.

Figure 11:
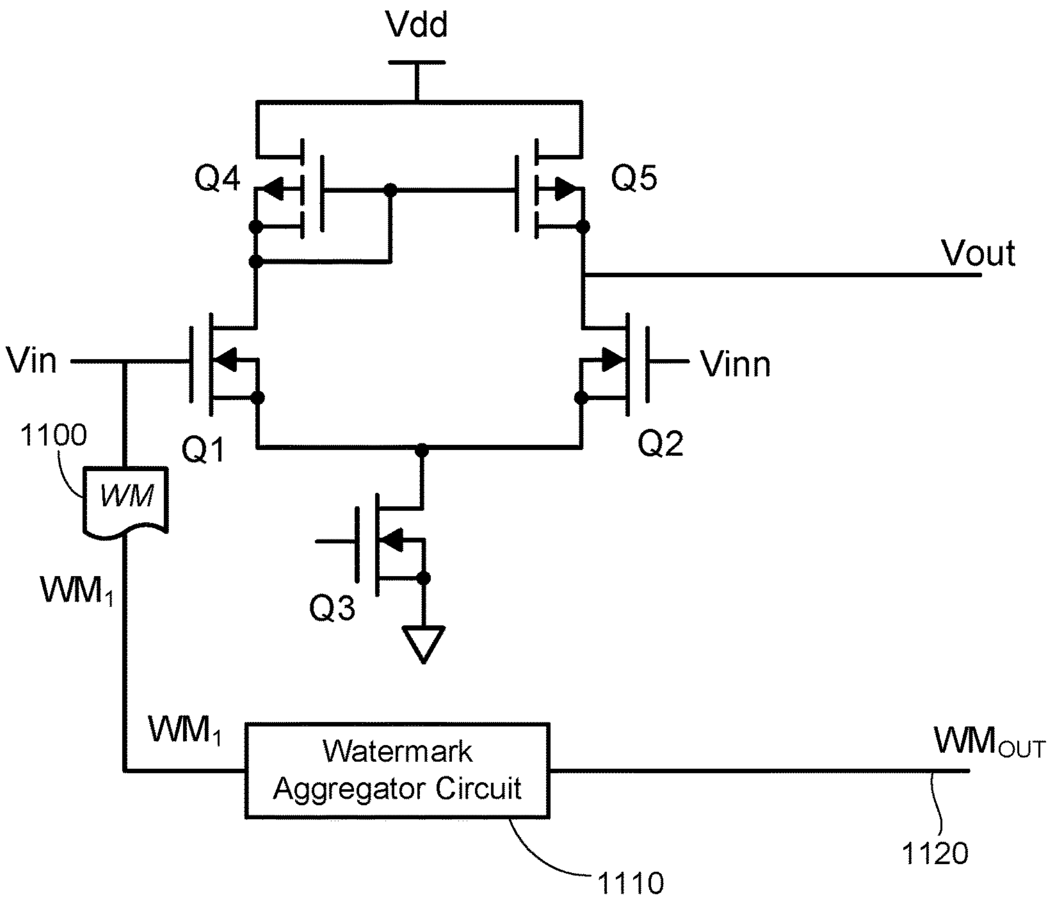
FIG. 11 depicts a watermark connected to the single stage differential amplifier of FIG. 9, in accordance with some embodiments of the present disclosure.

FIG. 11 depicts a watermark circuit 1100 connected to the single stage differential amplifier of FIG. 9, in accordance with some embodiments of the present disclosure. A watermark system includes the watermark circuit 1100, the watermark aggregator circuit 1110, and the watermark output pin 1120. The watermark circuit 1100 may be based on PTL as shown in FIG. 4. The watermark aggregator circuit 1110 may be a cascaded differential amplifier as shown in FIG. 5. Although only one watermark circuit is shown in FIG. 11, the detection system may identify additional locations in the single stage differential amplifier circuit where Trojans can be inserted and inserted watermarks at those locations, which are further connected to the watermark aggregator circuit 1110.

Figure 12:
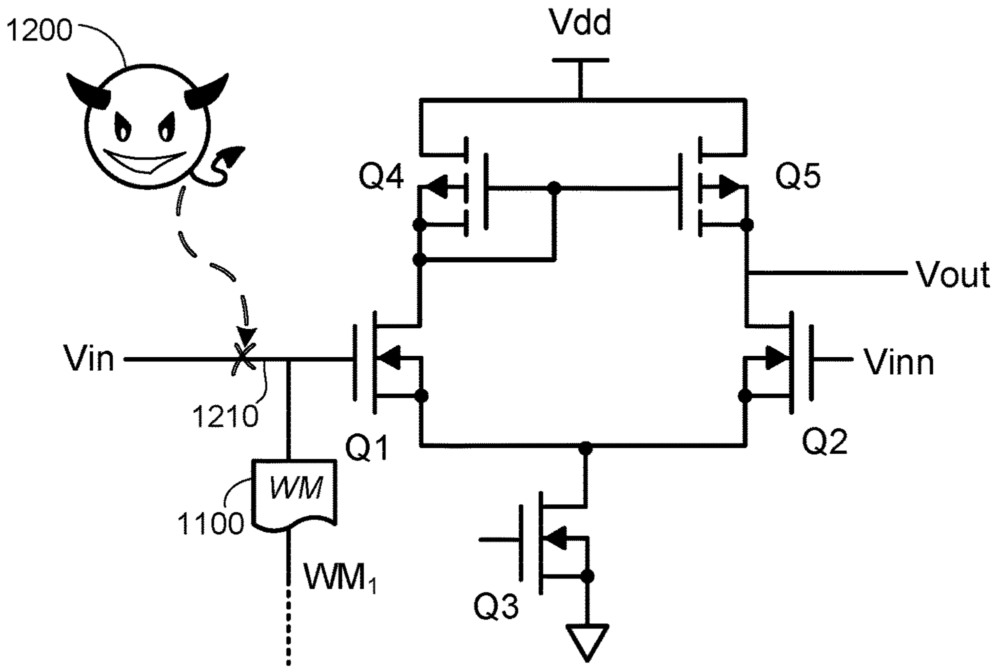
FIG. 12 depicts a malicious circuit inserted into the watermarked single stage differential amplifier circuit of FIG. 11, in accordance with some embodiments of the present disclosure.

FIG. 12 depicts a malicious circuit inserted into the watermarked single stage differential amplifier circuit of FIG. 11, in accordance with some embodiments of the present disclosure. Although not depicted, the watermark aggregator circuit 1110 and the watermark output pin 1120 are also connected to the single stage differential amplifier circuit as shown in FIG. 11. The malicious circuit 1200 is inserted at the insensitive node 1210 identified by the detection system. The insensitive node 1210 is located at the gate of Q1. The detection system uses the watermark circuit to detect the presence of the malicious circuit 1200. As the malicious circuit 1200 operates, the path sensitivity of the first path 1000 may remain the same as the path sensitivity prior to insertion. This is the intentional design of the malicious circuit 1200 to remain undetected. However, due to the watermark connected to the insensitive node 1210, the watermark output pin 1120 reflects a change in voltage caused by the operation of the malicious circuit 1200 that is not otherwise reflected in the path sensitivity of the first path 1000 (i.e., not detectable through $V_{out}$). The voltage change at the insensitive node 1210 is transmitted through the watermark circuit 1100 and amplified at the watermark aggregator circuit 1110 to be read out at the watermark output pin 1120.

After receiving the measurement at the watermark output pin 1120, the detection system determines whether the measurement is indicative of a malicious circuit present in the CUT by comparing the measurement to measurements taken at the watermark output pin 1120 with and/or without a malicious circuit inserted. In some embodiments, the system uses a machine learning model trained on measurements at the watermark output pin (e.g., voltage measurements) corresponding to the presence of a malicious circuit and/or the absence of a malicious circuit in the CUT. The watermark output pin 1120 may be coupled to an off-chip processor configured to apply the machine learning model to the measurements at the watermark output pin 1120.

The detection system receives a likelihood of the malicious circuit being present in the CUT as an output of the machine learning model. That is, the machine learning model can classify whether there is a malicious circuit connected to a watermark based on voltages measured at the watermark output pin. In response to determining that a likelihood exceeds a detection threshold, the system may generate a notification alerting an appropriate party (e.g., the circuit manufacturer or designer) that there has been a Trojan inserted into the circuit. The detection system may identify when in the design process the Trojan may have been inserted (e.g., based on which third parties had access to the design or circuit during fabrication), identify the names of the third parties who had access, and include this identified information in the generated notification. Additionally, the detection system may determine the authorities to alert and transmit the generated notification to the determined authorities.

The detection system may also detect when a watermark system or component thereof has been disconnected from the CUT. An attacker can remove a watermark circuit and fail to reconnect the wires between the watermark aggregator circuit and fail to reconnect the wires between the watermark aggregator circuit and the insensitive node. In this circumstance, that specific wire will be open, causing the measurement at the watermark output pin to reflect the high resistance of the open circuit. This deviation in watermark output pin voltage will be flagged by the system as different from Trojan-free output behavior. An attacker can remove a watermark circuit and reconnect the wires between the watermark aggregator circuit and the insensitive node. Even without the watermark circuit, the detection system is still effective in detecting an inserted Trojan because the insensitive node is still observable at the watermark output pin through the reconnected wire. An attacker can remove the watermark aggregator circuit (e.g., the cascaded differential amplifier circuit). In this circumstance, the attacker has broken the connection between the watermark aggregator circuit and the watermark output pin. This removal effect leads to an immediate change in the voltage at the watermark output pin, indicating that the CUT has been tampered with.

Figure 13:
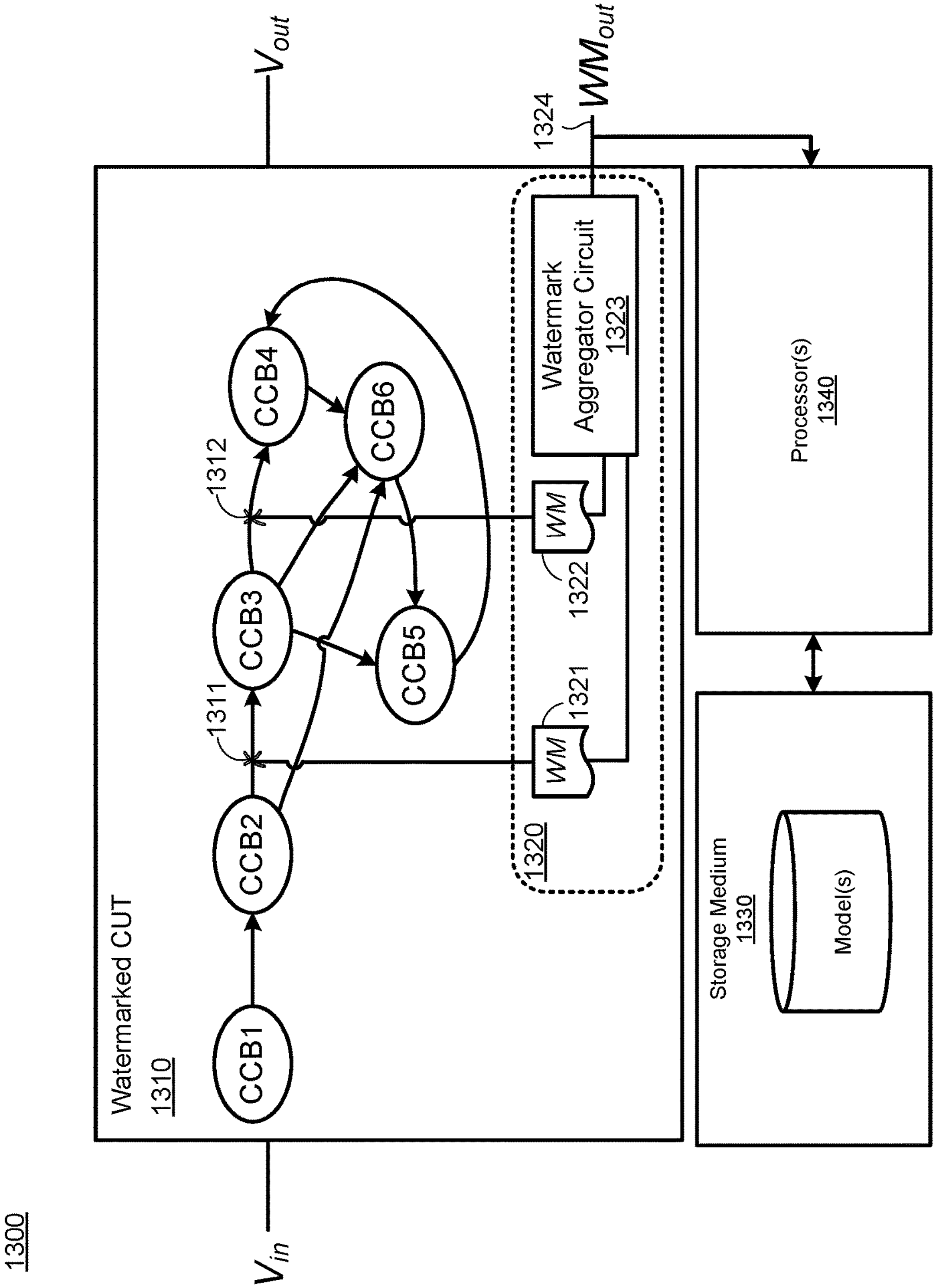
FIG. 13 depicts a testing system for testing whether a Trojan has been inserted into a watermarked analog circuit, in accordance with some embodiments of the present disclosure.

FIG. 13 depicts a testing system 1300 for testing whether a Trojan has been inserted into a watermarked analog circuit 1310, in accordance with some embodiments of the present disclosure. The testing system 1300 includes a storage medium 1330, and one or more processors 1340. The storage medium 1330 stores instructions that can be executed by the processor(s) 1340 to detect Trojans in a CUT and stores model(s) for such detection. The watermarked CUT 1310 includes a watermark system 1320. In some embodiments, the testing system may be a subsystem of the Trojan detection system described herein (or vice versa, i.e., the Trojan detection system is a subsystem of the testing system). For example, the Trojan detection system that identifies insensitive nodes and inserts the watermark system into the design of the analog circuit may also perform the functions of the testing system 1300. In some embodiments, the system 1300 may include fewer, additional, or different components. For example, the system 1300 may include equipment such as an oscilloscope for receiving an analog signal output from the watermarked CUT 1310 and converting the analog signal to a digital signal that is processable by the one or more processors 1340.

The system 1300 measures a watermark output pin 1324 of the watermark system 1320. The processor(s) 1340 determine, based on the measurement (e.g., the voltage at the pin 1324), whether there is a Trojan inserted into the watermarked CUT 1310. The processor(s) 1340 may access one or more machine learning models from the storage medium 1330 to make this determination. For example, the processor (s) 1340 access a machine learning model from the storage medium 1330, where the machine learning model is configured to classify whether a Trojan is inserted into an analog circuit based on a measurement (e.g., voltage signal) at a watermark output pin. The system 1300 may apply a measurement from the watermark output pin 1324 to the accessed machine learning model and receive a classification as output from the machine learning model. In some embodiments, the testing system 1300 may generate a feature vector representative of one or more operational parameters and a test input voltage, where the generated feature vector is an additional input to the machine learning model (i.e., in addition to the measured voltage at a watermark output pin).

In some embodiments, the system 1300 may additionally train one or more machine learning models that are stored in the storage medium 1330. For example, the system 1300 may access previously measured voltage signals at a watermark output pin and known classifications of whether there was a Trojan inserted into the analog circuit at the time the voltage signals were measured. The system 1300 may use these previously measured voltage signals and corresponding classifications to train a machine learning model. In another training example, the system 1300 may access previously measured operational parameters (e.g., temperature, supply voltage, or any other suitable characterization of a condition under which an analog circuit operates), associated test input voltages applied when the operational parameters were measured, measurements taken at a watermark output pin, and a classification of whether a Trojan was inserted into the analog circuit when the operational parameters were measured. The data used for training a machine learning model may also be stored in the storage medium 1330. The system 1300 may additionally collect additional data of these types when performing Trojan detection during operation of an analog circuit to store into the storage medium 1330 and use to re-train one of the machine learning models. The system 1300 may generate a feature vector representative of the operational parameters and test input voltages. The system 1300 may then use the generated feature vector and the measurement taken at the watermark output pin (i.e., the indication of whether a Trojan was inserted into the analog circuit) to train a machine learning model.

The one or more machine learning models may include a model that is configured to classify whether a Trojan is detected at a particular insensitive node. For example, a machine learning model may be trained on data that includes measurements at the watermark output pin 1324 when a Trojan has been inserted at a particular insensitive node (i.e., the measurements reflect only a Trojan inserted at that particular node, and at no other node). In another example, a machine learning model may be trained on data that includes measurements at the watermark output pin 1324 when multiple Trojans have been inserted at known combinations of insensitive nodes (i.e., the measurements reflect Trojans inserted only at that combination of nodes). In this way, machine learning models can be used to identify which node a Trojan has been inserted at in addition to detecting that there is a Trojan inserted into the analog circuit.

In some embodiments, the testing system 1300 may perform similar functions as the Trojan detection system that identifies insensitive nodes and inserts watermarks into an analog circuit. For example, during the design stage of the watermarked CUT 1310, the testing system 1300 may design the watermarked CUT 1310. In particular, the testing system 1300 may receive a design netlist of the CUT (without the watermark circuit 1320) and determine, from the design netlist, that the CUT can be split into six CCBs. The testing system 1300 can also determine the CCB connectivity graph (e.g., using a tool like the Synopsys Custom Compiler™ tool). The CCB connectivity graph indicates the number of outgoing paths from each CCB to a neighboring CCB. For every CCB, the testing system 1300 can develop transistor-twins of its PI, intermediate, and PO transistors. The testing system 1300 can then generate corresponding analog neural twins based on the connections in the CCB connectivity graph. For example, CCB3 has three outgoing paths to other CCBs. Thus, the detection system may generate three distinct analog neural twins (one twin for each path) from the input to CCB3 to the outputs of CCB4, CCB5, and CCB6, respectively. The testing system 1300 may then evaluate the path sensitivities of the paths using the analog neural twins.

The testing system 1300 can insert the watermark circuit 1320, which includes watermarks 1321 and 1322 and a watermark aggregator circuit 1323. The watermark circuit 1320 is connected to the input/output nodes between the CCBs, at the PI of the CUT, or at the PO of the CUT. In this example, the watermark circuit 1320 is connected to nodes 1311 and 1312 that the testing system 1300 identified as insensitive nodes.

Figure 14:
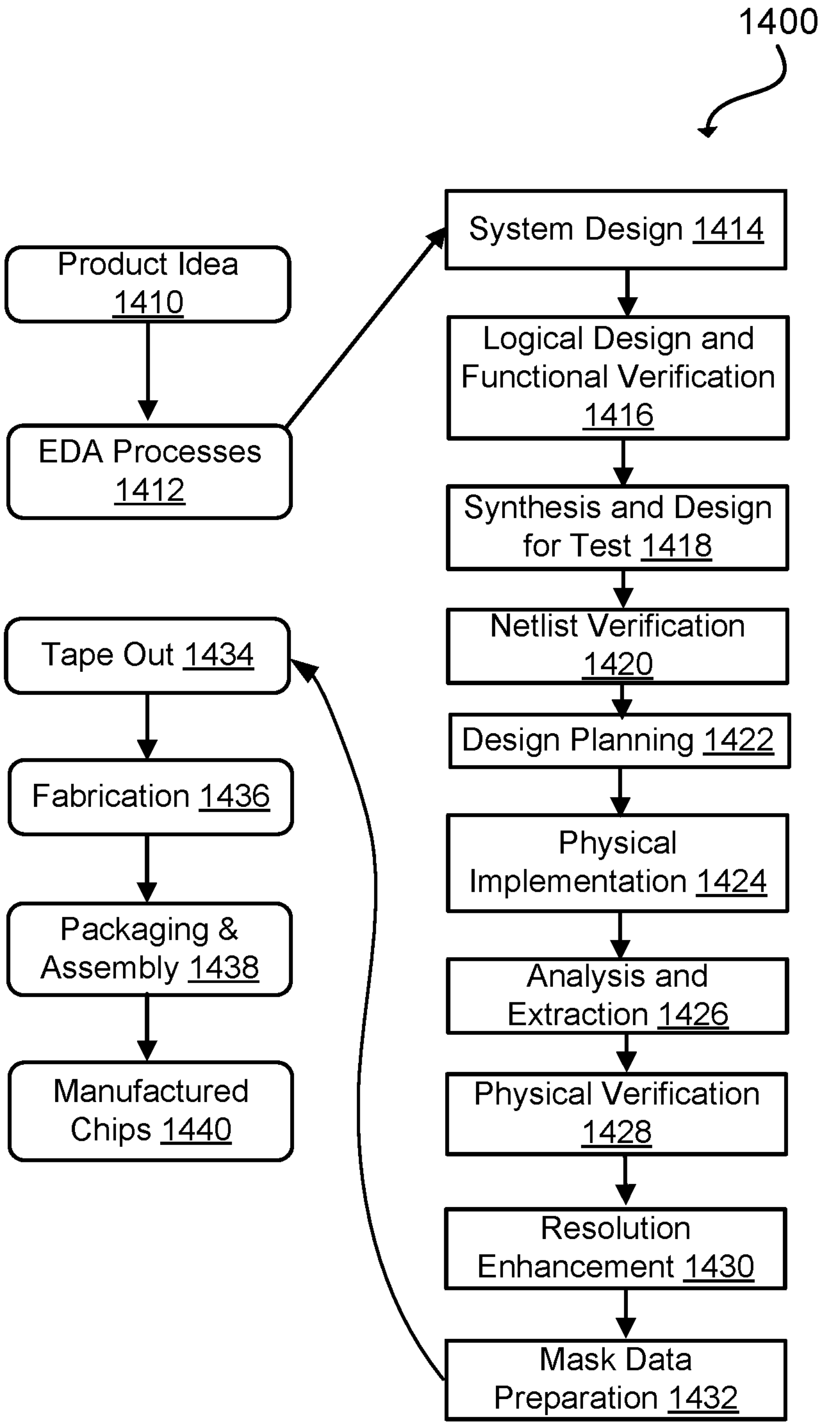
FIG. 14 is a flow diagram of various processes used during the design and manufacture of an integrated circuit in accordance with some embodiments of the present disclosure.

FIG. 14 illustrates an example set of processes 1400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1410 with information supplied by a designer, information which is transformed to create an article of manufacture that uses a set of EDA processes 1412. When the design is finalized, the design is taped-out 1434, which is when artwork (e.g., geometric patterns) for the integrated circuit is sent to a fabrication facility to manufacture the mask set, which is then used to manufacture the integrated circuit. After tape-out, a semiconductor die is fabricated 1437 and packaging and assembly processes 1438 are performed to produce the finished integrated circuit 1440.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 14. The processes described by be enabled by EDA products (or tools).

During system design 1414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1420, the netlist is checked for compliance with timing constraints and for correspondence with the HDL code. During design planning 1422, an overall floor plan for the integrated circuit is constructed and analyzed for timing and top-level routing.

During layout or physical implementation 1424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1426, the circuit function is verified at the layout level, which permits refinement of the layout design. During physical verification 1428, the layout design is checked to ensure that manufacturing constraints are correct, such as DRC constraints, electrical constraints, lithographic constraints, and that circuitry function matches the HDL design specification. During resolution enhancement 1430, the geometry of the layout is transformed to improve how the circuit design is manufactured.

During tape-out, data is created to be used (after lithographic enhancements are applied if appropriate) for production of lithography masks. During mask data preparation 1432, the 'tape-out' data is used to produce lithography masks that are used to produce finished integrated circuits.

A storage subsystem of a computer system (such as computer system 1500 of FIG. 15) may be used to store the programs and data structures that are used by some or all of the EDA products described herein, and products used for development of cells for the library and for physical and logical design that use the library.

FIG. 15 illustrates an example machine of a computer system 1400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may be configured to execute instructions 1526 for performing the operations and steps described herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In some implementations, the instructions 1526 include instructions to implement functionality corresponding to the present disclosure. While the machine-readable storage medium 1524 is shown in an example implementation to be a single medium, the term “machine-readable storage medium” should be taken to include a single medium or multiple media (e.g., a centralized or distributed database, and/or associated caches and servers) that store the one or more sets of instructions. The term “machine-readable storage medium” shall also be taken to include any medium that is capable of storing or encoding a set of instructions for execution by the machine and that cause the machine and the processing device 1502 to perform any one or more of the methodologies of the present disclosure. The term “machine-readable storage medium” shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system’s registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (“ROM”), random access memory (“RAM”), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

identifying, using one or more neural networks, a node in a design of an analog circuit as insensitive based on whether a functional signal path through the insensitive node is insensitive to voltage changes at the insensitive node caused by a malicious circuit connected to the insensitive node; and inserting a watermark system connecting the insensitive node to a watermark output pin, wherein voltage changes at the insensitive node caused by the malicious circuit connected to the insensitive node are observable at the watermark output pin.

2. The method of claim 1, wherein identifying the node in the design of the analog circuit as insensitive further comprises:

determining, using the one or more neural networks and a sweep of input voltages, sensitivities of functional signal paths connecting primary inputs (PIs) of the design to primary outputs (POs) of the design; and comparing the sensitivities of the functional signal paths to a sensitivity threshold, wherein the functional signal path having the insensitive node has a sensitivity below the sensitivity threshold.

3. The method of claim 2, wherein the one or more neural networks comprise a model of the design that is configured to predict a PO voltage, $V_{OUT}$, of the design based on a PI voltage, $V_{IN}$; and determining, using the one or more neural networks, the sensitivities of the paths connecting the PIs of the design to the POs of the design comprises:

determining, using the model, a change in $V_{OUT}$, $\Delta V_{OUT}$, caused by a change in $V_{IN}$, $\Delta V_{IN}$, wherein sensitivity is characterized by $\Delta V_{OUT}/\Delta V_{IN}$.

4. The method of claim 2, further comprising:

sorting the sensitivities of the functional signal paths based on the input voltages;

identifying one or more clusters of the sorted sensitivities; and determining the sensitivity threshold using a boundary of a cluster of the one or more clusters.

5. The method of claim 4, wherein the sensitivity threshold varies based on the input voltages.

6. The method of claim 1, further comprising:

identifying transistors in a functional signal path connecting a PI of the analog circuit to a PO of the analog circuit, the transistors arranged in a sequence along the functional signal path; and generating a transistor-twin for each of the identified transistors; wherein the transistor-twins are neural network representations of the identified transistors, and the one or more neural networks comprise the generated transistor-twins.

7. The method of claim 6, wherein a transistor-twin of an identified transistor is one of:

a current-based transistor-twin configured to predict a drain current for the identified transistor corresponding to an input gate voltage ($V_G$) of the identified transistor and one or more PIs of the analog circuit; or a voltage-based transistor-twin configured to predict an output drain voltage ($V_{DS}$) of the identified transistor corresponding to the $V_G$ of the identified transistor and the one or more PIs of the analog circuit.

8. The method of claim 7, wherein generating a current-based transistor-twin for an identified transistor comprises:

determining drain current test values based on a sweep of $V_G$ test inputs; and training the current-based transistor-twin using the sweep of $V_G$ test inputs and the drain current test values.

9. The method of claim 8, further comprising:

determining log magnitude values of the drain current test values, wherein the current-based transistor-twin is trained using the log magnitude values.

10. The method of claim 6, wherein the identified transistors include a PI transistor, an intermediate transistor, and a PO transistor, and wherein generating the transistor-twin for each of the identified transistors comprises:

generating a voltage-based transistor-twin for each of the PI transistor and the intermediate transistor; and generating one of a current-based transistor-twin or a voltage-based transistor-twin for the PO transistor.

11. An analog circuit comprising:

a plurality of channel connected blocks (CCBs); and a watermark system connected to an insensitive node between a pair of the CCBs, wherein a functional signal path through the insensitive node to an output pin is insensitive to voltage changes at the insensitive node caused by a malicious circuit connected to the insensitive node, the watermark system comprising:

a watermark circuit connected to the insensitive node, the watermark circuit passing a voltage signal at the insensitive node through to a watermark aggregator circuit connected to the watermark circuit, the watermark aggregator circuit generating an aggregated signal using the voltage signal, and a watermark output pin connected to the watermark aggregator circuit, wherein a measurement of the aggregated signal at the watermark output pin changes based on whether the malicious circuit is connected to the insensitive node.

12. The analog circuit of claim 11, wherein the watermark system further comprises the watermark aggregator circuit, wherein:

the watermark aggregator circuit is further connected to another watermark circuit of the watermark system, the other watermark circuit connected to another insensitive node, the watermark aggregator circuit generates the aggregated signal further using another voltage signal at the other insensitive node, and the measurement of the aggregated signal at the watermark output pin changes further based on whether the malicious circuit is connected to the insensitive node or the other insensitive node.

13. The analog circuit of claim 11, wherein the watermark circuit comprises pass transistor-based transmission gates.

14. The analog circuit of claim 12, wherein the watermark aggregator circuit is a cascaded differential amplifier.

15. The analog circuit of claim 11, wherein the malicious circuit is one of an A2 Trojan or a trickle charge (TC)-based Trojan.

16. A system comprising:

one or more processors; and a non-transitory computer readable medium comprising stored instructions, which when executed by the one or more processors, causes the one or more processors to:

measure a voltage at a watermark output pin connected to an analog circuit under test (CUT), wherein the watermark output pin is connected via a watermark circuit to an insensitive node of the analog CUT, and a functional signal path through the insensitive node to an output pin is insensitive to voltage changes at the insensitive node caused by connection of a malicious circuit to the insensitive node; and determine whether the malicious circuit is connected to the watermark circuit based on the measured voltage at the watermark output pin.

17. The system of claim 16, wherein determining whether the malicious circuit is connected to the watermark circuit based on the measured voltage at the watermark output pin comprises:

applying the measured voltage as input to a machine learning model, wherein the machine learning model is configured to classify whether the malicious circuit is connected to the insensitive node based on voltages measured at the watermark output pin.

18. The system of claim 17, wherein determining whether the malicious circuit is connected to the watermark circuit based on the measured voltage at the watermark output pin further comprises:

generating a feature vector representative of one or more operational parameters and a test input voltage, the one or more operational parameters characterizing a condition under which the analog circuit operates; and applying the feature vector as additional input to the machine learning model, wherein the machine learning model was trained using feature vectors and a test measurement taken at the watermark output pin with a presence of the malicious circuit at the analog circuit.

19. The system of claim 18, wherein the operational parameters include a supply voltage, $V_{DD}$, or a temperature.

20. The system of claim 16, wherein the non-transitory computer readable medium further comprises stored instructions that, when executed by the one or more processors, cause the one or more processors to:

determine that the watermark circuit has been removed from the analog circuit based on the measured voltage.

* * * * *